(12) United States Patent
Fanson

(10) Patent No.: US 9,912,569 B2
(45) Date of Patent: Mar. 6, 2018

(54) DATA COMMUNICATION METHOD FOR A SET OF HARD-REAL TIME APPLICATIONS WITHIN A NETWORK

(71) Applicant: EDGEWATER COMPUTER SYSTEMS, INC., Kanata (CA)

(72) Inventor: John Fanson, Ottawa (CA)

(73) Assignee: EDGEWATER COMPUTER SYSTEMS, INC., Kanata (CA)

( * ) Notice: Subject to any disclaimer, the term of this patent is extended or adjusted under 35 U.S.C. 154(b) by 609 days.

(21) Appl. No.: 13/870,853

(22) Filed: Apr. 25, 2013

(65) Prior Publication Data

US 2013/0294267 A1 Nov. 7, 2013

Related U.S. Application Data

(63) Continuation of application No. 11/953,711, filed on Dec. 10, 2007, now abandoned.

(51) Int. Cl.
| | |
|---|---|
| *H04L 12/26* | (2006.01) |
| *H04L 12/24* | (2006.01) |
| *H04L 12/923* | (2013.01) |
| *H04L 12/911* | (2013.01) |
| *H04L 29/08* | (2006.01) |

(52) U.S. Cl.
CPC .......... *H04L 43/16* (2013.01); *H04L 41/0896* (2013.01); *H04L 43/0823* (2013.01); *H04L 47/762* (2013.01); *H04L 47/822* (2013.01); *H04L 67/322* (2013.01); *H04L 69/323* (2013.01)

(58) Field of Classification Search
None
See application file for complete search history.

(56) References Cited

U.S. PATENT DOCUMENTS

| 6,185,202 B1 * | 2/2001 | Gockler ................ H04W 84/14 370/281 |
|---|---|---|
| 2004/0208563 A1 | 10/2004 | Roberts et al. ................. 398/70 |

(Continued)

OTHER PUBLICATIONS

Offcial Action dated Oct. 25, 2012 from parent U.S. Appl. No. 11/953,711 (15 pages).

(Continued)

*Primary Examiner* — Sulaiman Nooristany
(74) *Attorney, Agent, or Firm* — Murray IP Consulting Inc.; Sean Murray

(57) ABSTRACT

A data communication method for a set of hard real-time applications with an associated set of predefined network requirements (PNR) is provided. The method comprises configuring the physical layer of the network with a set of static modulation parameters (SMPs) to guarantee the PNRs are met at worst-case operating conditions for the network. The method further comprises measuring the current network performance within the network based on a given network performance monitoring schedule and, whenever the current network performance exceeds the PNRs by predefined amounts, adjusting the physical layer of the network by selecting a set of dynamic modulation parameters (DMP's) to increase the bandwidth availability within the network. Advantageously, the invention further allows for the allocation of the excess bandwidth to a set of non-hard real-time applications, whenever the current network performance exceeds the PNR.

18 Claims, 3 Drawing Sheets

(56) References Cited

U.S. PATENT DOCUMENTS

| | | | |
|---|---|---|---|
| 2006/0056305 A1* | 3/2006 | Oksman | H04L 1/0009 370/252 |
| 2006/0239272 A1 | 10/2006 | Heidari-Bateni et al. | 370/395.21 |
| 2008/0043859 A1 | 2/2008 | Moffatt | 375/260 |
| 2009/0110108 A1 | 4/2009 | Kennedy et al. | 375/295 |

OTHER PUBLICATIONS

Offcial Action dated Jun. 23, 2011 from parent U.S. Appl. No. 11/953,711 (14 pages).
Offcial Action dated Dec. 16, 2010 from parent U.S. Appl. No. 11/953,711 (13 pages).
Offcial Action dated Apr. 13, 2010 from parent U.S. Appl. No. 11/953,711 (11 pages).

* cited by examiner

DATA COMMUNICATION METHOD FOR A SET OF HARD-REAL TIME APPLICATIONS WITHIN A NETWORK

BACKGROUND OF THE INVENTION

A hard real-time application within a data network is a type of data communication in which a message is transmitted and successfully received over the network prior to a certain known deadline and with sufficient degree of certainty. An example of this would be control of a wing flap over an avionics bus. Thus, a minimum data rate and a maximum packet error rate must be guaranteed, under all operating conditions of the network. For multiple hard real-time applications, aggregate minimum data rate and maximum packet error rate requirements guaranteeing performance of the applications under all operating conditions can be defined. The set of these aggregate rates for a given set of hard real-time applications will be referred herein as the associated set of predefined network requirements (PNRs).

Similarly, a non-hard real-time application refers to a data communication process where there is no real-time constraint or deadline.

Current network performance of a given network is defined herein as a metric indicative of the data rate and bit error rate for each node pair in the network, at a given point in time. It is assumed to be substantially constant from the moment it is measured over a given period of time, following which a new current network performance measurement may be required.

Hard real time systems can be constructed using different media access protocols including a command/response protocol or a priority based protocol. Among others, the MIL-STD-1553 or simply 1553 is generally utilized for hard real time communication. 1553 is an approximately 30 year old technology that defines the electrical and signaling characteristics for 1 Mbps data rate communications over an asynchronous serial, command/response digital data bus on which messages are time division multiplexed among users. The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 specifies all of the electrical characteristics of the receivers, transmitters, and cable used to implement the bus, as well as the complete message transmission protocol. The messages are generally highly repetitive, and their content and periodicity are all pre-planned. The data capacity of 1 Mbps also comes with an associated bit error rate. Various notices, such as 1553a, 1553b, up to 1553e of the standard are available. For 1553b, there is a requirement to have a word or packet error rate of 1 in 10,000,000. In a lot of cases the bus will in fact support much higher communications rates at the same or lower packet error rate.

MIL-STD-1553B utilizes a primitive Manchester II bi-phase signaling scheme over shielded twisted pair cabling. This modulation scheme is bandwidth inefficient with most of its signal energy concentrated around 1 MHz. MIL-STD-1553b has little remaining capacity for existing applications and leaves little opportunity to enable additional communication capabilities.

Notice 5 of MIL-STD-1553 or 1553e provides an overlap of 1553 signals with signals based on Orthogonal Frequency Division Multiplexing (OFDM), for increased bandwidth availability for additional applications and without impact to the existent 1553 communication.

OFDM communication systems are generally designed to be rate adaptive in order to take advantage of the higher communications capacity of a particular channel at a particular time. Examples include technologies such as: 802.11a, HomePlug, HomePNA, WiMax, etc. Rate adaptation is usually implemented based on metric calculations from exchanging signals between two or more nodes on a network. These metrics are generally related to the signal to noise ratio (SNR) at the receiving device with the transmitter agreeing to use suitable modulation and coding to maximize the throughput for particular bit error rate for the channel. For OFDM communications, the number of bits assigned to an OFDM sub-carrier can be adapted independently for all sub-carriers.

A managed network (like a 1553b avionics network) refers to a controlled network where a network designer would configure and specify the number of communications devices as well as the details of the communications taking place. For 1553b, every message that is transmitted is specified according to a schedule delivered by a bus controller.

SUMMARY OF THE INVENTION

An object of the invention is to provide a data communication method for a set of hard real-time applications with an associated set of predefined network requirements (PNR). The method comprises configuring the physical layer of the network with a set of static modulation parameters (SMPs) to guarantee the PNRs are met at worst-case operating conditions for the network. The method further comprises measuring the current network performance within the network based on a given network performance monitoring schedule and, whenever the current network performance exceeds the PNRs by predefined amounts, adjusting the physical layer of the network by selecting a set of dynamic modulation parameters (DMP's) to increase the bandwidth availability within the network. Advantageously, the invention further allows for the allocation of the excess bandwidth to a set of non-hard real-time applications, whenever the current network performance exceeds the PNR.

Advantageously, the invention provides a robust and efficient communication method for hard real-time and non-hard real-time applications over a network.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
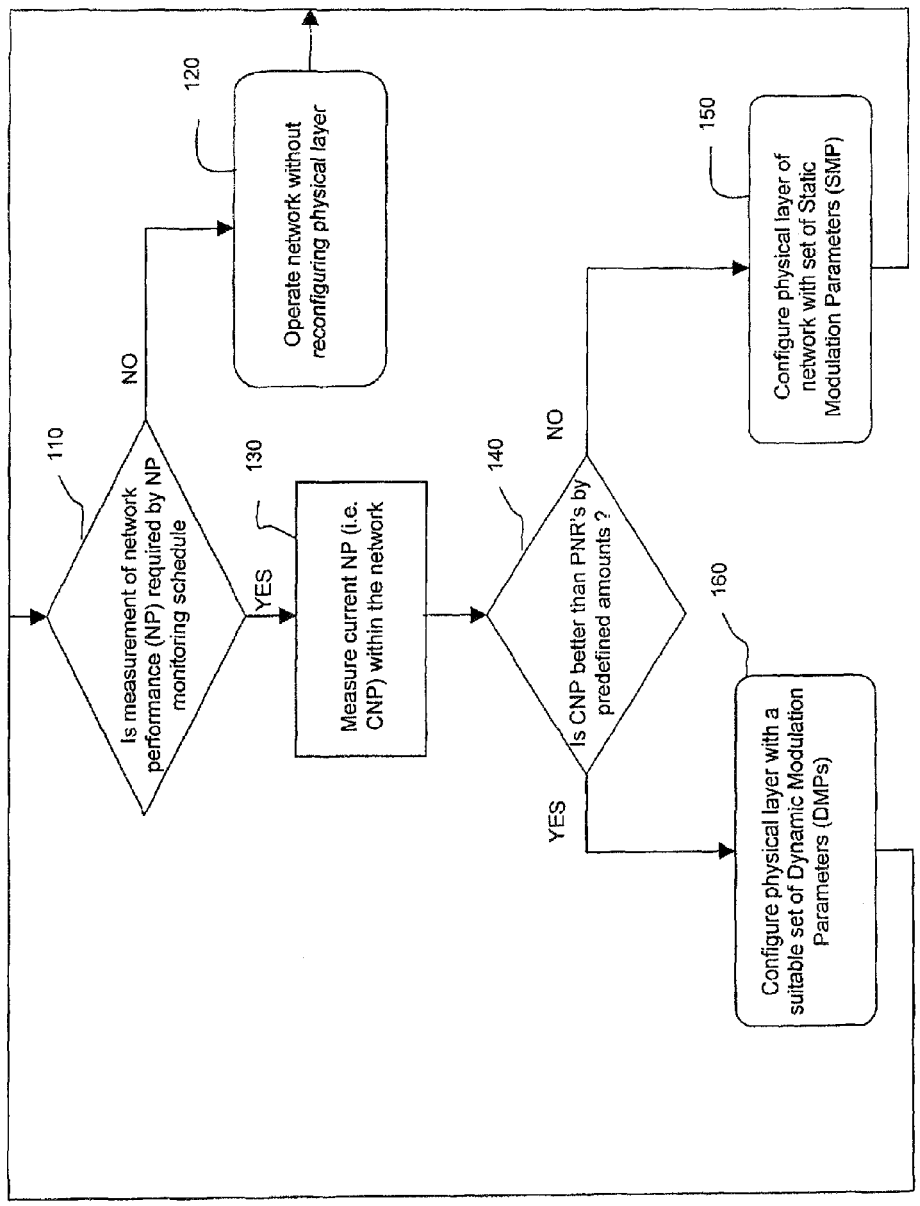
FIG. 1 is a flow chart of a data communication method for a given set of hard-real time applications, within a network, according to an embodiment of the invention.

FIG. 1 illustrates a flow chart of a data communication method 100 for a given set of hard-real time applications, within a network, according to an embodiment of the invention. The hard-real time applications have an associated set of predefined network requirements (PNRs) guaranteeing the applications are supported by the data network under any network operating conditions. To arrive at a set of PNR's, required maximum packet error rates and minimum data rates are first specified for each link direction within the network, for each hard real-time application to be supported. Following, aggregate packet error rates and aggregate data rates for all links in the network, for all hard real-time applications to be supported, can be deduced analytically or by measurement.

Within method 100, a check whether a measurement of the network performance (NP) is required by an NP monitoring schedule, is initially performed, at step 110. If such a measurement is not required, then the network is operated without reconfiguring its physical layer, as indicated by step 120. If a measurement of the NP is required by the NP monitoring schedule, than it is performed, at step 130, and a new current network performance (CNP) value is available. Following the measurement of the CNP, a determination as to whether the CNP is better than the set of PNR's by predefined amounts is carried out, at step 140. A CNP better than the set of PNR's is indicative of excess signal-to-noise ratio (SNR). If the answer to step 140 is negative, the physical layer of the network is configured with a set of Static Modulation Parameters (SMP's), step 150. Use of the set of SMP's at all nodes in the network will result in a network performance that meets the set of PNR's for all network operating conditions. If the answer to step 140 is positive, the physical layer of the network is configured with a suitable set of Dynamic Modulation Parameters (DMP's), step 160. DMP's are designed to take advantage of the more favorable current network performance in the network by increasing bandwidth while keeping the error rates as required by the set of PNR's. Generally, specific steps of method 100 may be carried out either in a centralized, a distributed manner, or a combination of these, within the network. In the preferred embodiment, method 100 is carried out at each node in the network.

The data communication method 100 may further comprise, in case of a positive answer to step 140, allowing the excess bandwidth to be assigned to non-hard real time applications.

The data communication method 100 can be carried over any network that can support hard real-time applications and monitoring of the network performance. The networks can be constructed using different media access protocols including a command/response protocol or a priority based protocol. According to the preferred embodiment of the invention, the network is a 1553 network, comprising a bus controller (BC) and remote terminals RT's communicating over a data bus. The data communication occurs via 1553 and OFDM signaling as described in co-pending U.S. application Ser. No. 11/419,742. In addition, messaging within the network occurs based on a schedule transmitted by a bus controller (BC) to all remote terminals (RTs).

Operating conditions can be any factors that may affect network performance, and may include, without limitation, environmental factors such as pressure, temperature, refractive index of propagating medium, in the case of an avionics data bus altitude, airplane velocity, as well as various operating modes such as combat, sitting on the tarmac in the case of a military airplane, etc.

The monitoring of network performance can be carried out based on various SNR-related performance metrics for bus conditions such as Bit Error Rate (BER), receiver power etc. Such metrics could be monitored periodically, as well as averaged over appropriate time intervals, according to specific system topologies and communication requirements.

Configuring the physical layer with various sets of modulation parameters implies setting the various terminals within the network, or their modems, to communicate data according to various modulation parameters. Without limitation, physical layer modulation parameters include transmitter power, modulation scheme such as OFDM, modulation level such as BPSK, QPSK, 16QAM for M-QAM systems, error correction scheme, bits/tone of modulation scheme subcarriers, convolutional code rate such as ½, ¾, ⅞, transmitter digital scaling, power spectral density etc. Advantageously, in addition to physical layer parameters, other higher layer parameters, such as Media Access Control (MAC) parameters, may be used. For example, the preferred embodiment also uses frame length as a modulation parameter. Likewise, overhead size, or other subframe size, could be used.

While a unique set of SMPs is defined in connection with a default mode of communication and allowing for the required set of hard real-time applications to be supported under any circumstances, several sets of DMP's may be available for selection, each of them supporting the given set of hard real-time applications within associated amounts of excess bandwidth. The number of the DMP sets available can be dependent, among others, on the desired granularity of the excess bandwidth, non-hard application bandwidth requirements, etc.

An example of using the method 100 of FIG. 1 for a two node network is detailed next.

Figure 2:
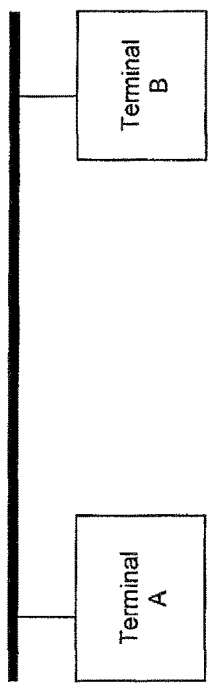
FIG. 2 is a diagram of a two node network using the method in FIG. 1.

The two node network 50 of FIG. 2 comprises Terminal A and Terminal B linked by a data bus. For this example, a first hard real-time application that has to transmit data from Terminal A to Terminal B and a second hard real-time application that has to transmit data from Terminal B to Terminal A. The set of predefined network requirements for the two applications are, respectively packet error rates, PER1 and PER2, and data rates or static capacities, SC1 and SC2. Note that there is a data rate associated with each direction of the link as it is generally assumed that the channel capacity is not reciprocal.

A set of SMP's that guarantee the set of PNR's is met for the two applications under all operating conditions of network 50 can be determined. In practice, it may be difficult to ascertain the SMP's under all conditions and a margin of error may be built in for safety. Furthermore, all additional overhead for the protocols used and the overhead associated with the network performance monitoring schedule are advantageously taken into account when determining the set of SMP's. Even further, in a managed network such as a 1553 network, the fact that communication occurs on a scheduled basis must also be taken into account when determining the set of SMP's.

It is assumed that the operating conditions are time varying and there will be a significant amount of time in which the current network performance is more favorable than the set of PNR's, allowing for communication to occur at a higher rate and still satisfy the packet error rate requirements. Under these more favorable conditions, terminals A and B can negotiate a suitable set of the Dynamic Modulation Parameters (DMP) to achieve a higher communication rate.

The current network performance or communication quality can be monitored between terminals by exchanging signals periodically.

Figure 3:
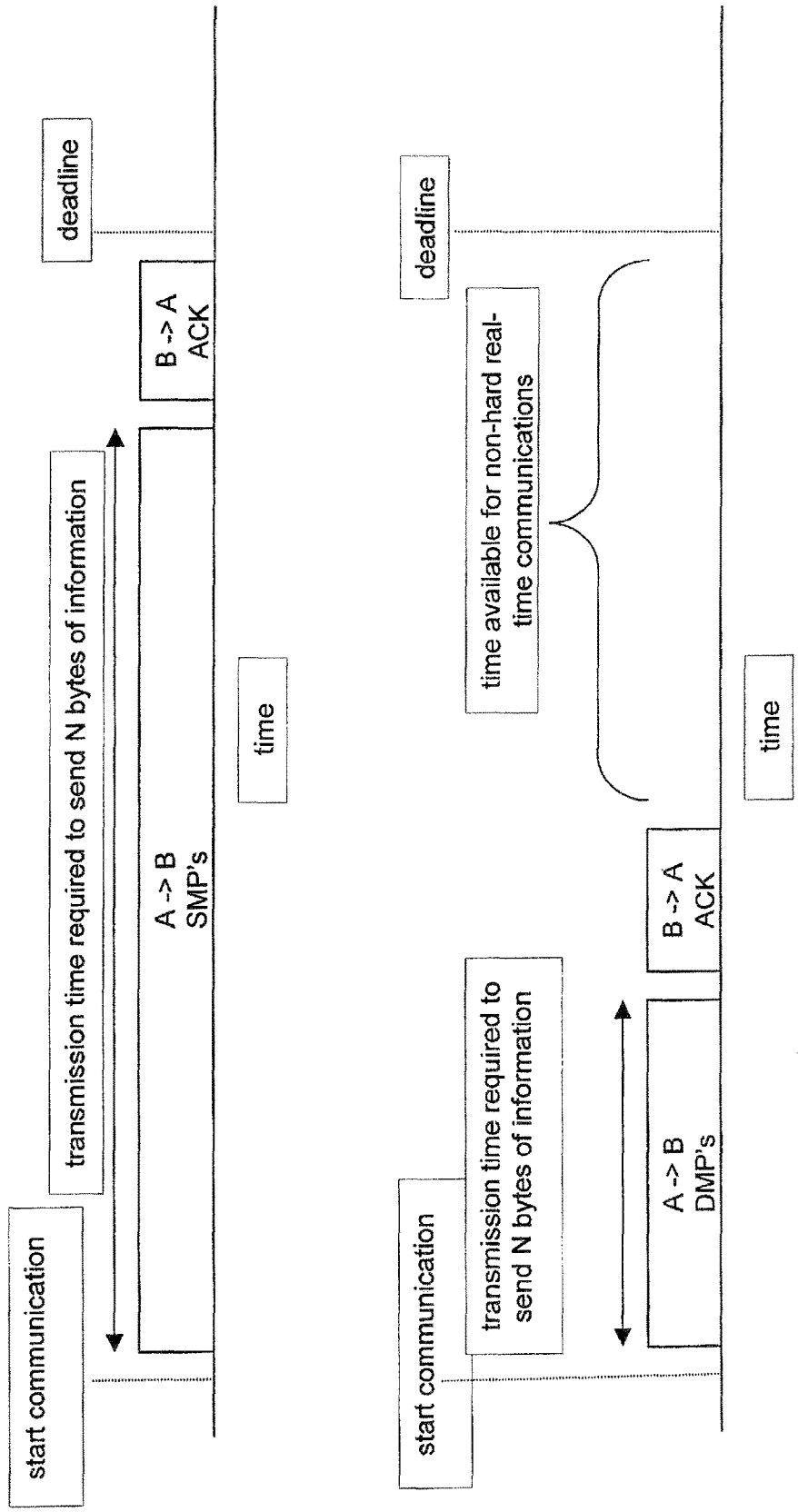
FIG. 3 is a timing diagram for data communication occurring within the network in FIG. 2, according to a preferred embodiment of the invention.

In using DMP's, the network capacity is improved and the time it takes to transmit and receive hard-real time messages is reduced. If the capacity of the network was previously fully utilized, this would free up time to send more messages. The additional bandwidth can be used to allow for non-hard-real time applications. An example is illustrated in FIG. 3. An acknowledgement (ACK) frame is included to indicate proper decoding of the transmitted message.

It has to be noted that in some instances, due to changing operating conditions, using only the set of SMPs may lead to a current network performance better than the set of PNRs. The excess bandwidth available in these situations can also be used for additional non-hard real time applications, without a change from the set of SMPs to a DMPs set.

When operating based on a set of DMPs, the conditions where the network capacity drops back to the worst case must be taken into account. If a message is transmitted using DMP's and it is decoded incorrectly, a message retry (re-transmit) scheme may either attempt to re-transmit the message using the DMP's or drop back immediately to the set of SMP's, in order to guarantee that the communications requirements are met. In the first scenario, the overhead of the retries should preferably be taken into account.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method for managing a communication network in which a set of hard real-time applications having predefined network requirements are supported, the predefined network requirements comprising a required maximum packet error rate and minimum data rate for each link direction within the network for each hard real-time application, the method comprising:
   i. configuring a plurality of data modems with a set of static physical layer modulation parameters to guarantee the predefined network requirements for each of the hard real-time applications are met at worst-case operating conditions for the network;
   ii. measuring the current network performance within the network based on Signal-to-Noise (SNR) related performance metrics to determine if the current network performance exceeds the predefined network requirements for each of the hard real-time applications by predefined amounts;
   iii. configuring the plurality of data modems with a set of dynamic physical layer modulation parameters to increase bandwidth availability within the network if the current network performance exceeds the predefined network requirements for each of the hard real-time applications by predefined amounts; and
   iv. reconfiguring the plurality of data modems with the set of static physical layer modulation parameters if the current network performance no longer exceeds the predefined network requirements for each of the hard real-time applications by predefined amounts;

wherein the sets of static and dynamic physical layer modulation parameters are selected from a group consisting of transmitter power, transmitter digital scaling, power spectral density, modulation level, modulation scheme, bits/tone of OFDM subcarriers error correction scheme and convolutional code rate.

2. The method of claim 1 further comprising, if a message is decoded incorrectly using the set of dynamic physical layer modulation parameters, retransmitting the message within the network using the set of dynamic physical layer modulation parameters for a number of retries dependent on an overhead of retries.

3. The method of claim 1 further comprising: allocating excess bandwidth from configuring the plurality of data modems with the set of dynamic physical layer modulation parameters to a set of non-hard real-time applications whenever the current network performance exceeds the predefined network requirements for each of the hard real-time applications.

4. The method of claim 1, wherein the measuring the current network performance within the network based on SNR related performance metrics occurs on a network performance monitoring schedule.

5. The method of claim 1, wherein the sets of static and dynamic physical layer modulation parameters are OFDM parameters.

6. The method of claim 1 further comprising adjusting a Media Access Control (MAC) layer by selecting a set of MAC layer dynamic modulation parameters to increase the bandwidth availability within the network if the current network performance exceeds the predefined network requirements for each of the hard real-time applications by predefined amounts.

7. The method of claim 6, wherein the MAC layer dynamic modulation parameters are selected from the group of frame size and overhead size.

8. A method for managing a communication network in which a set of hard real-time applications having predefined network requirements are supported, the predefined network requirements comprising a required maximum packet error rate and minimum data rate for each link direction within the network for each hard real-time application, the method comprising:
   i. configuring a plurality of data modems with a set of static physical layer modulation parameters to guarantee the predefined network requirements for each of the hard real-time applications are met at worst-case operating conditions for the network;
   ii. measuring the current network performance within the network based on Signal-to-Noise (SNR) related performance metrics to determine if the current network performance exceeds the predefined network requirements for each of the hard real-time applications by predefined amounts;
   iii. configuring the plurality of data modems with a set of dynamic physical layer modulation parameters to increase the bandwidth availability within the network if the current network performance exceeds the predefined network requirements for each of the hard real-time applications by predefined amounts; and
   iv. reconfiguring the plurality of data modems with the set of static physical layer modulation parameters if a message transmitted with the set of dynamic physical layer modulation parameters is decoded incorrectly, wherein the sets of static and dynamic physical layer modulation parameters are selected from a group consisting of transmitter power, transmitter digital scaling, power spectral density, modulation level, modulation scheme, bits/tone of OFDM subcarriers error correction scheme and convolutional code rate.

9. The method of claim 8 further comprising, if a message is decoded incorrectly using the set of dynamic physical layer modulation parameters, retransmitting the message within the network using the set of dynamic physical layer modulation parameters for a number of retries dependent on an overhead of retries prior to reconfiguring the plurality of data modems with the set of static physical layer modulation parameters.

10. The method of claim 8 further comprising: allocating excess bandwidth from configuring the plurality of data modems with the set of dynamic physical layer modulation parameters to a set of non-hard real-time applications whenever the current network performance exceeds the predefined network requirements for each of the hard real-time applications.

11. The method of claim 8, wherein the measuring the current network performance within the network based on SNR related performance metrics occurs on a network performance monitoring schedule.

12. The method of claim 8, wherein the sets of static and dynamic physical layer modulation parameters are OFDM parameters.

13. The method of claim 8 further comprising adjusting a Media Access Control (MAC) layer by selecting a set of MAC layer dynamic modulation parameters to increase the bandwidth availability within the network if the current network performance exceeds the predefined network requirements for each of the hard real-time applications by predefined amounts.

14. The method of claim 13, wherein the MAC layer dynamic modulation parameters are selected from the group of frame size and overhead size.

15. A method for managing a communication network in which a set of hard real-time applications having predefined network requirements are supported, the predefined network requirements comprising a required maximum packet error rate and minimum data rate for each link direction within the network for each hard real-time application, the method comprising:

i. configuring a plurality of data modems with a set of static physical layer modulation parameters to guarantee the predefined network requirements for each of the hard real-time applications are met at worst-case operating conditions for the network;

ii. measuring the current network performance within the network based on Signal-to-Noise (SNR) related performance metrics to determine if the current network performance exceeds the predefined network requirements for each of the hard real-time applications by predefined amounts; and iii. configuring the plurality of data modems with a set of dynamic physical layer modulation parameters to increase the bandwidth availability within the network if the current network performance exceeds the predefined network requirements for each of the hard real-time applications by predefined amounts;

iv. reconfiguring the plurality of data modems with the set of static physical layer modulation parameters if the current network performance no longer exceeds the predefined network requirements for each of the hard real-time applications by predefined amounts;

wherein the sets of static and dynamic physical layer modulation parameters are selected from a group consisting of transmitter power, transmitter digital scaling, power spectral density, modulation level, modulation scheme, bits/tone of OFDM subcarriers error correction scheme and convolutional code rate.

16. The method of claim 15 further comprising, if a message is decoded incorrectly using the set of dynamic physical layer modulation parameters, retransmitting the message within the network using the set of dynamic physical layer modulation parameters.

17. The method of claim 16, wherein the retransmitting the message within the network using the set of dynamic physical layer modulation parameters is done for a number of retries dependent on an overhead of retries.

18. The method of claim 16 further comprising reconfiguring the plurality of data modems with the set of static physical layer modulation parameters if a message transmitted with the set of dynamic physical layer modulation parameters is decoded incorrectly.

* * * * *